(12) United States Patent
Yoshikawa

(10) Patent No.: US 10,423,114 B2
(45) Date of Patent: Sep. 24, 2019

(54) POWER SUPPLY DEVICE, IMAGE FORMING APPARATUS, AND OUTPUT CONTROL METHOD

(71) Applicant: RICOH COMPANY, Ltd., Ohta-Ku (JP)

(72) Inventor: Keita Yoshikawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/482,835

(22) Filed: Apr. 10, 2017

(65) Prior Publication Data

US 2017/0299999 A1 Oct. 19, 2017

(30) Foreign Application Priority Data

Apr. 15, 2016 (JP) ................. 2016-082016

(51) Int. Cl.
  *G03G 15/00* (2006.01)
  *H02M 3/04* (2006.01)
  *H02M 5/04* (2006.01)

(52) U.S. Cl.
  CPC .............. *G03G 15/80* (2013.01); *H02M 3/04* (2013.01); *H02M 5/04* (2013.01)

(58) Field of Classification Search
  CPC .............. G03G 15/80; G03G 15/0283; G03G 15/0266; G03G 15/1665; G03G 15/5004; G03G 15/2039; G03G 15/1675; G03G 21/1857; G03G 21/1867; H02M 3/04; H02M 3/22; H02M 3/24; H02M 3/28; H02M 3/285; H02M 3/325; H02M 3/335; H02M 3/33507; H02M 3/33523; H02M 3/3353; H02M 3/33538; H02M 3/33546; H02M 3/33553; H02M 3/156; H02M 5/00; H02M 5/02; H02M 5/04; H02M 5/10; H02M 5/18; H02M 5/22; H02M 5/275; H02M 5/293
  USPC ................ 323/222–226, 234, 266, 268–275, 323/282–288, 351; 363/15–21.18, 37, 363/40–48, 74, 89, 123–134; 399/12, 26, 399/37, 38, 44, 45, 48, 50, 75, 88, 89, 66, 399/176
  See application file for complete search history.

(56) References Cited

U.S. PATENT DOCUMENTS

| 6,605,879 B2 * | 8/2003 | Wade ...................... H02J 9/062 307/66 |
| 2013/0223867 A1 | 8/2013 | Nakamura et al. |
| 2014/0079418 A1 | 3/2014 | Tanaka et al. |
| 2014/0204429 A1 | 7/2014 | Miyadera et al. |

(Continued)

FOREIGN PATENT DOCUMENTS

JP   2014-077981   5/2014

*Primary Examiner* — Alex Torres-Rivera
*Assistant Examiner* — Carlos O Rivera-Perez
(74) *Attorney, Agent, or Firm* — Xsensus LLP

(57) ABSTRACT

A power supply device includes a DC power supply circuit to output a DC voltage, an AC power supply circuit to generate an AC voltage, and a power supply control circuit to control the DC power supply circuit and the AC power supply circuit. The AC power supply circuit outputs a superimposed voltage in which the DC voltage is superimposed with the AC voltage. The power supply control circuit controls the DC power supply circuit to output the DC voltage according to a DC output value corresponding to the AC voltage.

21 Claims, 12 Drawing Sheets

(56) References Cited

U.S. PATENT DOCUMENTS

2015/0093137 A1* 4/2015 Minami ................. G03G 15/80
                                                            399/89
2017/0299987 A1* 10/2017 Sugimoto .......... G03G 15/1605

* cited by examiner ness of the present invention and should not be
POWER SUPPLY DEVICE, IMAGE FORMING APPARATUS, AND OUTPUT CONTROL METHOD

CROSS-REFERENCE TO RELATED APPLICATIONS

This patent application is based on and claims priority pursuant to 35 U.S.C. § 119(a) to Japanese Patent Application No. 2016-082016, filed on Apr. 15, 2016, in the Japan Patent Office, the entire disclosure of which is hereby incorporated by reference herein.

BACKGROUND

Technical Field

Embodiments of the present disclosure relate to a power supply device, an image forming apparatus, and an output control method.

Description of the Related Art

Electrophotographic image forming apparatuses typically include a charging device to charge an image bearer uniformly, expose the image bearer to form an electrostatic latent image, a developing device to develop the electrostatic latent image with toner into a toner image, a transfer device to transfer the toner image onto a recording medium, and fixing device to fix the toner image on the recording medium.

In transferring toner onto a recording medium having a coarse surface, the transfer rate to a recessed portion is low, compared with a projecting portion. Since use of a superimposed voltage in which AC voltage is superimposed with DC voltage can enhance the transfer rate of toner, there are image forming apparatuses that include a transfer power supply including an alternating-current power supply.

SUMMARY

An embodiment of the present invention provides a power supply device that includes a DC power supply circuit to output a DC voltage, an AC power supply circuit to generate an AC voltage, and a power supply control circuit to control the DC power supply circuit to output the DC voltage according to a DC output value corresponding to the AC voltage. The AC power supply circuit outputs a superimposed voltage in which the DC voltage is superimposed with the AC voltage.

In another embodiment, an image forming apparatus includes an image forming device to form an image, a transfer device to transfer the image onto a recording medium, and the above-described power supply device, to supply the superimposed voltage to the transfer device.

In yet another embodiment, an output control method includes generating an AC voltage, determining a DC output value in accordance with the AC voltage, outputting a DC voltage according to the DC output value, and outputting a superimposed voltage in which the DC voltage is superimposed with an AC voltage.

In yet another embodiment, a power supply device include means for outputting a DC voltage, means for outputting a superimposed voltage in which the DC voltage is superimposed with an AC voltage, and means for controlling the means for outputting the DC voltage and the means for outputting the superimposed voltage. The means for controlling controls the means for outputting the DC voltage to output the DC voltage according to a DC output value corresponding to the AC voltage.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
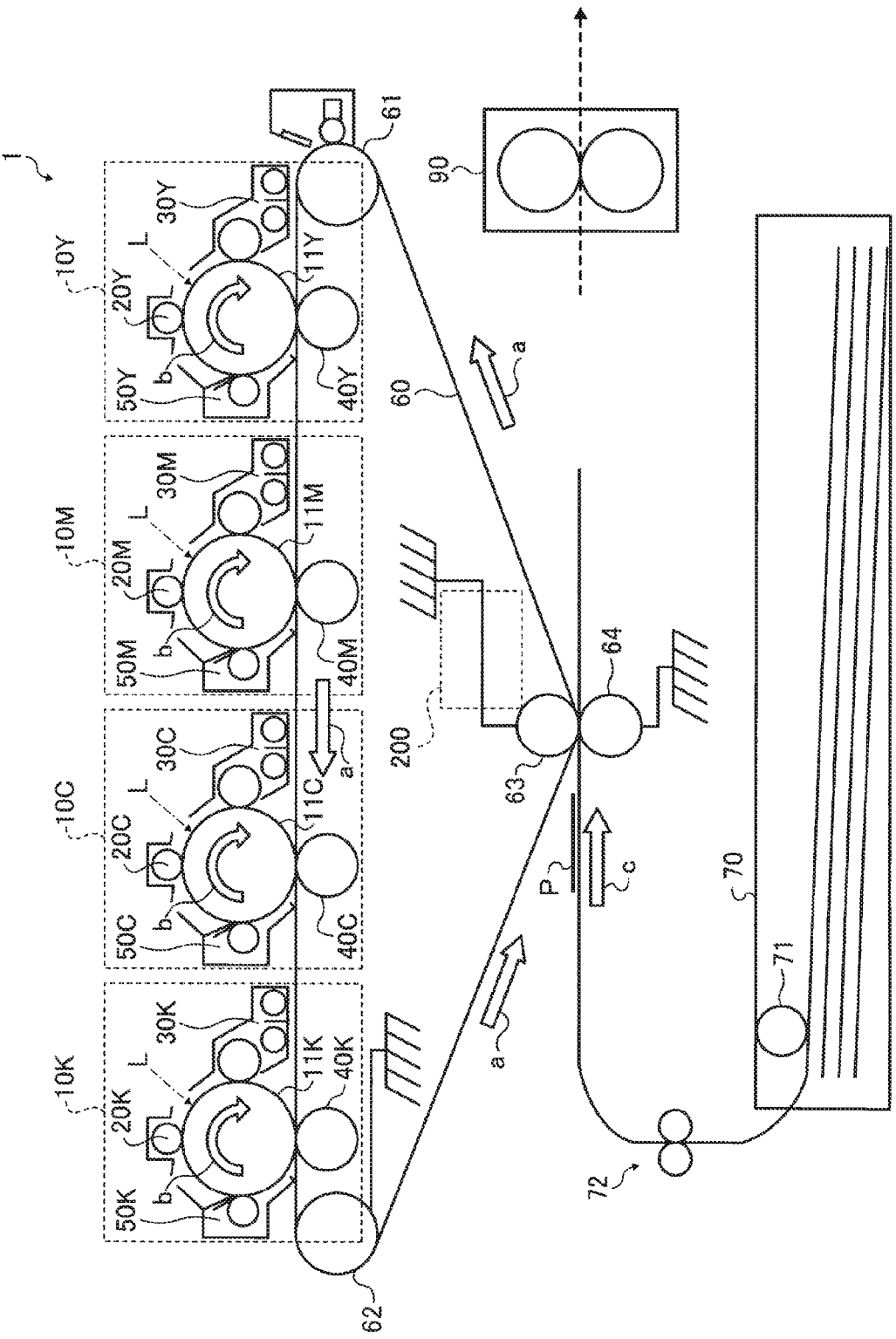
FIG. 1 is a schematic view illustrating a mechanical configuration of a printer as an image forming apparatus according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image forming apparatus according to an embodiment of the present invention is described. As used herein, the singular forms "a", "an", and "the" are intended to include the plural forms as well, unless the context clearly indicates otherwise.

Although the descriptions are given below of a color printer employing electrophotography, in particular, a printer to superimpose a yellow (Y) image, a magenta (M) image, a cyan (C) image, and a black (K) image to form a color image on a recording medium, one or more of aspects of this disclosure are applicable to other types of image forming apparatuses.

One or more of aspects of this disclosure are applicable to electrophotographic apparatuses, such as, copiers and multifunction peripherals (MFPs), to form either monochrome (or single color) or multicolor images. The term "MFP" refers to apparatuses having multiple functions including at least two of printing function, copying function, scanner function, facsimile function, and the like.

It is to be noted that the suffixes Y, M, C, and K attached to each reference numeral indicate only that components indicated thereby are used for forming yellow, magenta, cyan, and black images, respectively, and hereinafter may be omitted when color discrimination is not necessary.

FIG. 1 is a schematic view illustrating a mechanical configuration of a printer 1 according to the present embodiment. As illustrated in FIG. 1, the printer 1 includes image forming units 10Y, 10M, 10C, and 10K, an intermediate transfer belt 60, support rollers 61 and 62, a secondary-transfer backup roller 63 (a repulsive roller), a secondary transfer roller 64, a sheet tray 70, a sheet feeding roller 71, a conveyance roller pair 72, a fixing device 90, and a secondary-transfer power supply 200.

The image forming units 10Y, 10M, 10C, and 10K are lined along the intermediate transfer belt 60, in the order of yellow, magenta, cyan, and black from the upstream side in the direction indicated by arrow a, in which the intermediate transfer belt 60 rotates.

Figure 2:
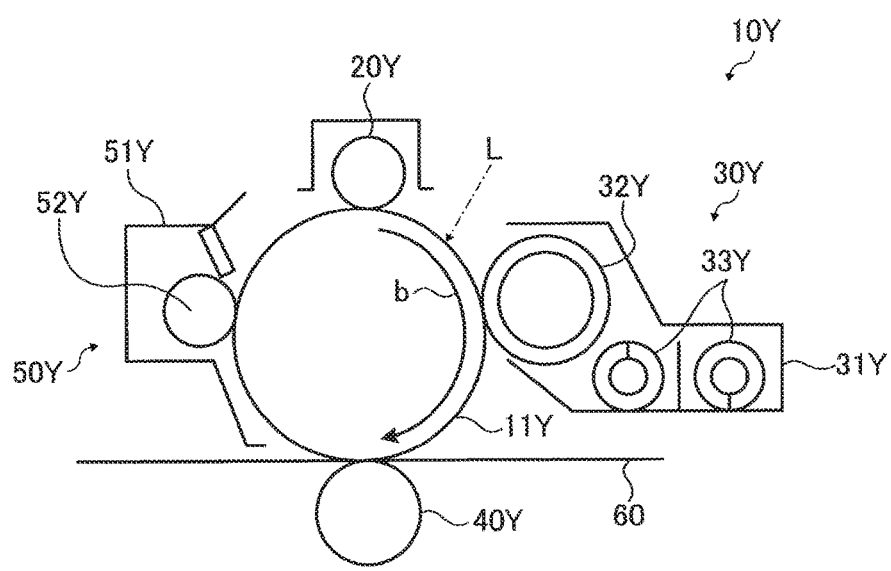
FIG. 2 is a schematic cross-sectional view of an image forming unit according to an embodiment.

FIG. 2 is a schematic cross-sectional view of the image forming unit 10Y according to the present embodiment. As illustrated in FIG. 2, the image forming unit 10Y includes a photoconductor drum 11Y, a charging device 20Y, a developing device 30Y, a primary transfer roller 40Y, and a cleaning device 50Y. The image forming unit 10Y performs image forming process, which includes charging, exposure, developing, transfer, and cleaning processes, on the photoconductor drum 11Y, thereby forming a yellow toner image on the photoconductor drum 11Y and transferring the yellow toner image onto the intermediate transfer belt 60.

Components of the image forming units 10M, 10C, and 10K are similar to those of the 10Y. The image forming unit 10M performs the image forming process to form a magenta toner image, the image forming unit 10C performs the image forming process to form a cyan toner image, and the image forming unit 10K performs the image forming process to form a black toner image. Accordingly, the components of the image forming unit 10Y are mainly described below. Descriptions of the components of the image forming units 10M, 10C, and 10K, which are given reference numerals identical to those of image forming unit 10Y and a reference M, C, or K instead of Y in FIG. 1, are omitted to avoid redundancy.

The photoconductor 11 serves as an image bearer and rotates in the direction indicated by arrow b in FIG. 1. For example, the photoconductor drum 11Y is an organic photoconductor (OPC) having an outer diameter of 60 mm. Similarly, the photoconductor drums 11M, 11C, and 11K rotate in the direction indicated by arrow b.

Note that, in some embodiments, the photoconductor drum 11K for black is rotated by a driving system independent of a driving system to rotate the photoconductor drums 11Y, 11M, and 11C. In such a configuration, in the case of monochrome image formation, only the photoconductor drum 11K for black is driven. In the case of color image formation, the photoconductor drums 11Y, 11M, and 11C, in addition to the photoconductor drum 11K, are driven simultaneously.

Initially, in the charging process, the charging device 20Y charges the surface of the photoconductor drum 11Y that is rotating. Specifically, for example, the charging device 20Y applies, to a charging roller, a superimposed voltage in which an alternating current (AC) voltage is superimposed on a direct current (DC) voltage. The charging roller is a roller-shaped conductive, elastic body. Thus, the charging device 20Y generates a direct electrical discharge between the charging roller and the photoconductor drum 11Y and charges the photoconductor drum 11Y to a predetermined polarity, for example, negative (minus) polarity.

Subsequently, in the exposure process, an exposure device irradiates the charged surface of the photoconductor drum 11Y with a laser beam L that is modulated optically, thus forming an electrostatic latent image on the photoconductor drum 11Y. The irradiation with the laser beam L reduces the absolute value of electrical potentials on the surface of the photoconductor drum 11Y. The irradiated portion, in which the absolute value of the potential is reduced, becomes an electrostatic latent image (an image portion). The remaining portion (not irradiated), in which the absolute value of the potential is kept high, becomes a background portion.

Subsequently, in the developing process, the developing device 30Y develops the electrostatic latent image on the photoconductor drum 11Y with yellow toner into a yellow toner image.

The developing device 30Y includes a casing 31Y (defining a container to contain developer), a developing sleeve 32Y contained in the casing 31Y, and screws 33Y contained in the casing 31Y. The casing 31Y contains two-component developer including yellow toner (toner particles) and carrier (carrier particles). The developing sleeve 32Y, serving as a developer bearer, is disposed opposite the photoconductor drum 11Y via an opening of the casing 31Y. The screws 33Y are developer conveyors to convey the developer while stirring the developer. One of the screws 33Y is disposed on a supply side adjacent to the developing sleeve 32Y, to supply the developer to the developing sleeve 32Y. The other screw 33Y is disposed on a receiving side to which toner is supplied from a toner supply device. The screws 33Y are rotatably supported via bearings on the casing 31Y.

In the transfer process, the primary transfer roller 40Y transfers the yellow toner image from the photoconductor drum 11Y onto the intermediate transfer belt 60. Note that, after the transfer process, a small amount of toner tends to remain untransferred on the photoconductor drum 11Y.

For example, the primary transfer roller 40Y is an elastic roller including a conductive sponge layer and pressed to the photoconductor drum 11Y from the back side (inside the loop) of the intermediate transfer belt 60. Note that, as a primary transfer bias, a bias controlled under constant-current control is applied to the elastic roller. For example, the primary transfer roller 40Y has an outer diameter of 16 mm and a core diameter of 10 mm, and the sponge layer has a resistance R of 3E7Ω. To obtain the resistance R of the sponge layer, a grounded metal roller having an outer diameter of 30 mm is pressed against the sponge layer at a load of 10 N, and a voltage of 1000 V is applied to the core of the primary transfer roller 40Y. The resistance R is calculated using Ohms law: R=V/I, where I represents the current flowing at that time.

In the cleaning process, the cleaning device 50Y collects untransferred toner remaining on the photoconductor drum 11. The cleaning device 50Y includes a cleaning blade 51Y and a cleaning brush 52. The cleaning blade 51Y cleans the surface of the photoconductor drum 11Y in a state contacting or abutting against the photoconductor drum 11 in the direction counter to the direction of rotation of the photoconductor drum 11. The cleaning brush 52Y contacts the photoconductor drum 11Y while rotating in a direction opposite the direction of rotation of the photoconductor drum 11Y. The cleaning brush 52Y cleans the surface of the photoconductor drum 11 in that state.

Referring back to FIG. 1, the intermediate transfer belt 60 is an endless belt looped around a plurality of rollers including the support rollers 61 and 62 and secondary-transfer backup roller 63 and rotates in the direction indicated by arrow a as one of the support rollers 61 and 62 is driven. Onto the intermediate transfer belt 60, initially the image forming unit 10Y transfers the yellow toner image. Subsequently, the image forming units 10M, 10C, and 10K respectively transfer the magenta, cyan, and black toner images and superimpose the toner images on the intermediate transfer belt 60. Thus, a multicolor toner image (a full-color image) is formed on the intermediate transfer belt 60. The intermediate transfer belt 60 conveys the full-color toner image to a position between the secondary-transfer backup roller 63 and the secondary transfer roller 64.

For example, the intermediate transfer belt 60 is made of an endless polyimide resin in which carbon is dispersed and has a thickness of 20 to 200 μm (preferably, about 60 μm), a volume resistivity of 6.0 to 13.0 log Ω·cm (preferably, 7.5 to 12.5 log Ω·cm, and, more preferably, about 9 log Ω·cm), and a surface resistivity of 9.0 to 13.0 log Ω/sq. (preferably, 10.0 to 12.0 log Ω/sq.) The volume resistivity is measured using Hiresta HRS probe, manufactured by Mitsubishi Chemical Corporation, with application of a voltage of 100 V and measurement time of 10 seconds. The surface resistivity is measured using Hiresta HRS probe, manufactured by Mitsubishi Chemical Corporation, with application of a voltage of 500 V and measurement time of 10 seconds. The support roller 62 is grounded.

The sheet tray 70 contains a plurality of sheets stacked one on another. When the printer 1 includes a plurality of sheet trays, sheet type and sheet size can be different for each sheet stray. In the present embodiment, as the recording medium, plain paper or Leathac (registered trademark) paper having a coarse surface is used. The recording medium, however, is not limited thereto but include, for example, overhead projector (OHP) transparency and film.

The sheet feeding roller 71 is disposed in contact with the top sheet of recording sheets P on the sheet tray 70 to feed the top sheet.

The conveyance roller pair 72 conveys the recording sheet P fed by the sheet feeding roller 71, at a predetermined timing, in the direction indicated by arrow c to the position between the secondary-transfer backup roller 63 and the secondary transfer roller 64.

In a secondary transfer nip between the secondary-transfer backup roller 63 and the secondary transfer roller 64, the secondary-transfer backup roller 63 and the secondary transfer roller 64 transfer the full-color toner image from the intermediate transfer belt 60 onto the recording sheet P conveyed by the conveyance roller pair 72.

For example, the secondary-transfer backup roller 63 has an outer diameter of 24 mm and a core diameter of 16 mm and includes a conductive rubber layer made of a nitrile butadiene rubber (NBR). The conductive NBR layer has a resistance R of 6.0 to 12.0 log Ω, preferably, 4.0 log Ω. For example, the secondary transfer roller 64 has an outer diameter of 24 mm and a core diameter of 14 mm and includes a conductive layer of a nitrile butadiene rubber (NBR). Note that the conductive NBR layer has a resistance R of 6.0 to 8.0 log Ω, preferably, 7.0 to 8.0 log Ω. The volume resistivity of the secondary transfer roller 64 is a value measured in rotation measurement under conditions of applied load of 5 N per one side and a bias of 1 KV applied to the transfer roller shaft. The resistivity is measured for one minute, during which the secondary transfer roller 64 makes a full turn, and the mean value is used as the volume resistivity.

To the secondary-transfer backup roller 63, the secondary-transfer power supply 200 for transfer bias application is coupled. The secondary-transfer power supply 200 applies voltage to the secondary-transfer backup roller 63 to transfer the toner image (e.g., a full-color image) onto the recording sheet P in the secondary transfer nip. Specifically, the secondary-transfer power supply 200 applies a superimposed voltage in which DC voltage and AC voltage are superimposed on each other, which is hereinafter simply refer to as "superimposed bias", to the secondary-transfer backup roller 63. This action generates a potential difference between the secondary-transfer backup roller 63 and the secondary transfer roller 64, causing a voltage to move the toner from the intermediate transfer belt 60 toward the recording sheet P. Thus, the full-color toner image is transferred onto the recording sheet P. The potential difference referred to in the present embodiment is represented as the potential of the secondary-transfer backup roller 63 minus the potential of the secondary transfer roller 64.

The fixing device 90 applies heat and pressure to the recording sheet P bearing the toner image to fix the toner image thereon. Then, the recording sheet P on which the full-color toner image is fixed is discharged outside the printer 1.

Figure 3:
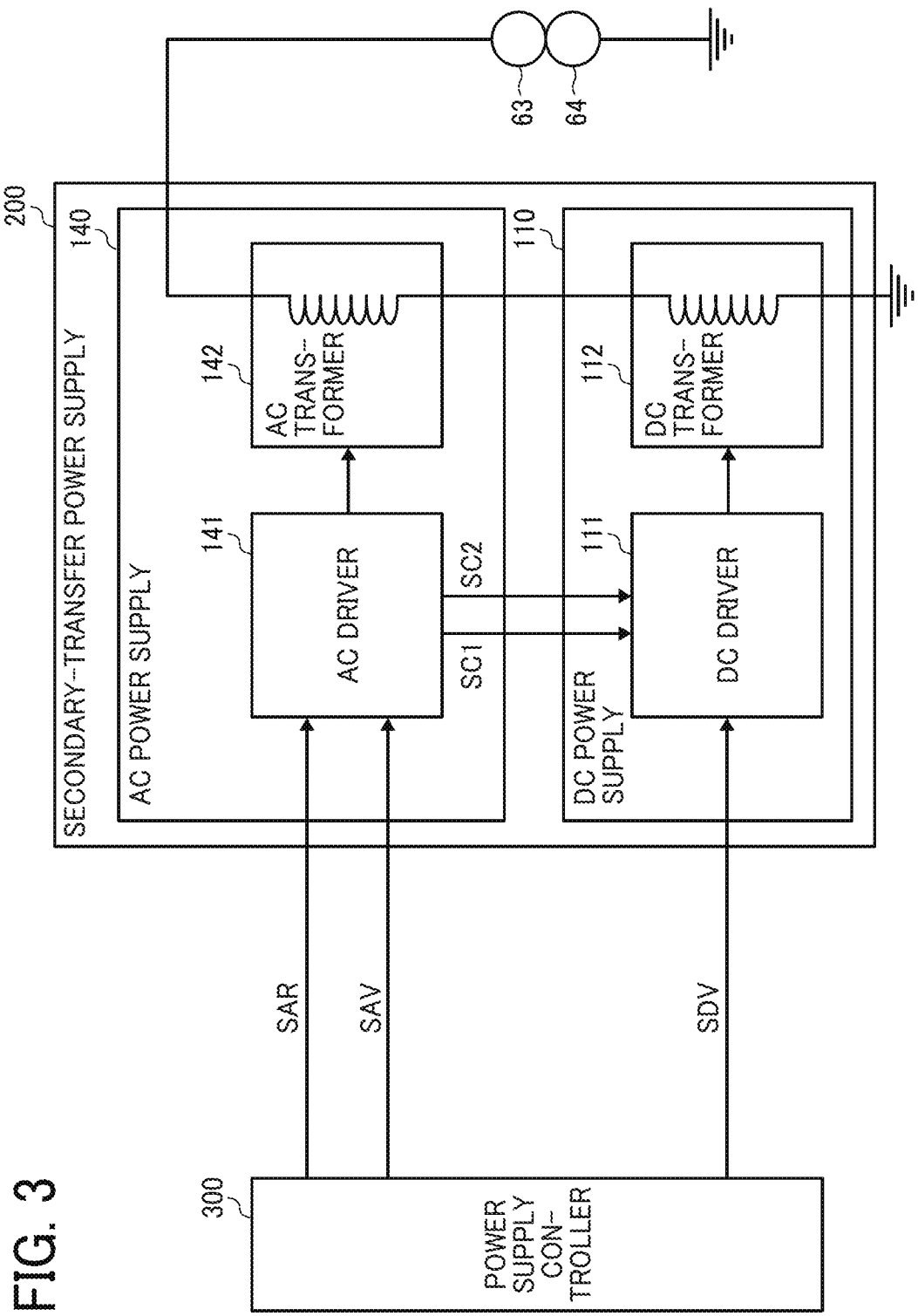
FIG. 3 is a block diagram illustrating electric circuitry of the printer, according to an embodiment.

FIG. 3 is a block diagram illustrating an example of electric circuitry of the printer 1 according to the present embodiment. As illustrated in FIG. 3, the printer 1 includes the secondary-transfer power supply 200 and the power supply controller 300. The secondary-transfer power supply 200 includes a DC power supply 110 and an AC power supply 140. The DC power supply 110 is connected in series with the AC power supply 140.

The DC power supply 110 outputs a DC voltage to the AC power supply 140, for example, to generate electric power to be used for transferring toner. In the present embodiment, the DC power supply 110 outputs the DC voltage based on a DC output value corresponding to the AC voltage generated by the AC power supply 140. More specifically, the DC output value is determined by the waveform of the AC voltage output. The present embodiment is described using an example in which the DC voltage output from the DC power supply 110 is in negative (minus) polarity. However, the polarity is not limited thereto.

The DC power supply 110 includes a DC driver 111 and a DC transformer 112. The DC driver 111 is implemented by, for example, a drive circuit to drive the DC transformer 112.

The AC power supply 140 outputs electric power to be used to vibrate toner. The AC power supply 140 generates an AC voltage, superimposes the generated AC voltage with the DC voltage output from the DC power supply 110, and outputs the superimposed voltage to the secondary-transfer backup roller 63.

The AC power supply 140 includes an AC driver 141 and an AC transformer 142. The AC driver 141 is implemented by, for example, a drive circuit to drive the AC transformer 142.

Figure 4:
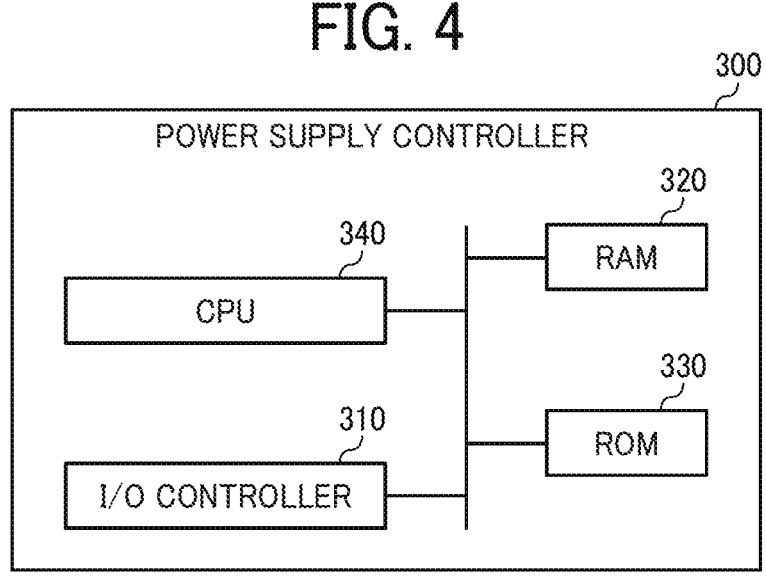
FIG. 4 is a block diagram illustrating circuitry of a power supply controller of the electric circuitry illustrated in FIG. 3.

The power supply controller 300 controls the secondary-transfer power supply 200. FIG. 4 is a block diagram illustrating an example of circuitry of the power supply controller 300. As illustrated in FIG. 4, the power supply controller 300 includes an input/output (I/O) controller 310, a random access memory (RAM) 320, a read only memory (ROM) 330, and a central processing unit (CPU) 340.

The I/O controller 310, which is implemented by an I/O interface circuit, controls input and output of various types of signals, such as signals transmitted to and signals transmitted from the secondary-transfer power supply 200.

The RAM 320 is a volatile memory and used as, for example, a work area for the CPU 340.

The ROM 330 is a nonvolatile read-only memory. The ROM 330 stores programs executed in power supply control and data used in various types of processing executed in the power supply control. Note that, in another embodiment, the ROM 330 is implemented by a flash memory to enable data writing.

The CPU 340 receives user setting (instructions from users) in the form of high voltage output from a control panel and instructs, via the I/O controller 310, the secondary-transfer power supply 200 to output a high voltage according to the user instruction received. In the present embodiment, the user instructions, output as high voltage, are described using an example in which the AC voltage used for the superimposed bias has either a high-duty waveform or a low-duty waveform. However, the user instructions are not limited thereto.

Specifically, the term "high-duty waveform" means an output waveform having a duty cycle not smaller than a threshold, and the term "low-duty waveform" means an output waveform having a duty cycle smaller than the threshold. In the present embodiment, the threshold is 50%. Although a description is given below of an example in which the duty cycle of the high-duty waveform is 80% and the duty cycle of the low-duty waveform is 20%, the duty cycles are not limited thereto.

Additionally, in the present embodiment, when an image is transferred onto a recording medium having a coarse surface such as Japan paper, the user instruction is output as a high voltage in the low-duty waveform. When an image is transferred onto a recording medium having a smooth surface such as plain paper, the user instruction is output as a high voltage in the high-duty waveform. However, the assignment of waveform is not limited thereto.

When a superimposed voltage (DC voltage plus AC voltage) is applied to the output side of the AC power supply, the DC voltage may be set to prevent the superimposed voltage from exceeding the withstand voltage of the AC power supply.

To enhance the transfer rate of toner onto the recording medium, the output waveform of AC voltage may be changed according to the degree of surface coarseness (surface unevenness) of the recording medium, instead of switching the voltage for image transfer between DC voltage and AC voltage.

Typically, AC power supplies output an AC voltage such that the sum of output energy is zero, that is, an integral value of the AC voltage is zero. Accordingly, when the output waveform of AC voltage is changed, the maximum value and the minimum value of the AC voltage differ depending on the waveform.

The output value of DC voltage is set such that the superimposed voltage does not exceed the withstand voltage of the AC power supply in use of AC voltage having an output waveform in which the maximum value is in the polarity identical to the polarity of DC voltage, of various types of output waveforms.

When the DC voltage thus set is superimposed with AC voltage having a different output waveform, however, the value of the superimposed voltage may deviate from a range suitable for image transfer, resulting in poor transfer performance.

The power supply device, the image forming apparatus, and the output control method according to an aspect of this disclosure are capable of outputting a superimposed voltage suitable to a specific application, while complying with a withstand voltage, even when the AC voltage to be superimposed with the DC voltage is changed.

Descriptions are given below of control of a superimposed bias according to the present embodiment.

Although the description below concerns an example in which the secondary-transfer power supply 200 (the DC power supply 110 and the AC power supply 140) is controlled under constant-voltage control, alternatively, the secondary-transfer power supply 200 is controlled under constant-current control in another embodiment. Additionally, in the example below, the withstand voltage on the output side (an output terminal) of the AC transformer 142 of the AC power supply 140 is 15 kV in absolute value, but the withstand voltage is not limited thereto.

Figure 5:
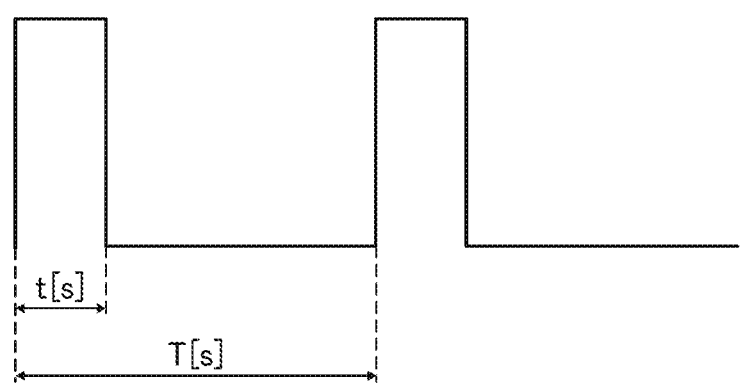
FIG. 5 is a chart illustrating an alternating-current (AC) output reference signal from the power supply controller illustrated in FIG. 3.

The power supply controller 300 outputs an AC output reference signal SAR to the AC power supply 140. The AC output reference signal SAR is for determining the waveform of the output AC voltage. In the present embodiment, the AC output reference signal SAR is, but not limited to, a pulse-width modulation (PWM) signal illustrated in FIG. 5. In FIG. 5, the duty cycle is represented as $(t/T) = 100,$ where T represents a cycle (1/T represents frequency), and t represents a pulse width.

Note that, the cycle T and the pulse width t of the AC output reference signal SAR are the cycle and the pulse width of the AC voltage generated by (the superimposed voltage output from) the AC power supply 140, respectively. Accordingly, the duty cycle of the AC output reference signal SAR is identical to the duty cycle of the AC voltage generated by the AC power supply 140.

As described above, in the present embodiment, the duty cycle of the high-duty waveform is 80%, and the duty cycle of the low-duty waveform is 20%. Accordingly, when the high-duty waveform is assigned to the user instruction output as high voltage, the power supply controller 300 outputs, to the AC power supply 140, an AC output reference signal SAR in which, for example, the cycle T is 2.0 milliseconds and the pulse width t is 1.6 milliseconds so that the duty cycle is set at 80%. When the low-duty waveform is assigned for the user instruction of high-voltage output, the power supply controller 300 outputs, to the AC power supply 140, an AC output reference signal SAR in which, for example, the cycle T is 2.0 milliseconds and the pulse width t is 0.4 millisecond so that the duty cycle is set at 20%.

In response to the AC output reference signal SAR from the power supply controller 300, based on the AC output reference signal SAR to identify the waveform of the AC voltage, the AC driver 141 outputs a control signal in accordance with the duty cycle of the output waveform of the AC voltage generated by the AC power supply 140. The control signal is one of a plurality of control signals (restriction signals). Specifically, the AC driver 141 determines, based on the received AC output reference signal SAR identifying the duty cycle of the AC voltage, whether the duty cycle of the output waveform of the AC voltage generated by the AC power supply 140 is equal to or greater than the threshold. When the duty cycle is equal to or greater than the threshold, the AC driver 141 outputs a first control signal SC1 to the DC power supply 110. When the duty cycle is smaller than the threshold, the AC driver 141 outputs a second control signal SC2 to the DC power supply 110.

In the present embodiment, the AC driver 141 determines whether the duty cycle of the received AC output reference signal SAR is not smaller than 50%. When the duty cycle is not smaller than 50%, the AC driver 141 outputs the first control signal SC1 to the DC power supply 110. When the duty cycle is smaller than 50%, the AC driver 141 outputs the second control signal SC2 to the DC power supply 110.

In the present embodiment, the first control signal SC1 indicates that the output value of DC voltage is to be restricted, and the second control signal SC2 indicates that the output value of DC voltage is not to be restricted. However, those indications of signals are not limited thereto.

Additionally, although the description is made based on an example in which the first control signal SC1 and the second control signal SC2 are signals switchable between active and inactive, the signal type is not limited thereto. In the present embodiment, outputting the first control signal SC1 means, but not limited to, activating the first control signal SC1, and outputting the second control signal SC2 means, but not limited to, activating the second control signal SC2.

Further, the power supply controller 300 outputs a DC output value signal SDV to the DC power supply 110. The DC output value signal SDV indicates a second DC output value to restrict the value of DC voltage output from the DC power supply 110. In the present embodiment, the DC output value signal SDV is a pulse-width modulation (PWM) signal, but not limited thereto.

Figure 6:
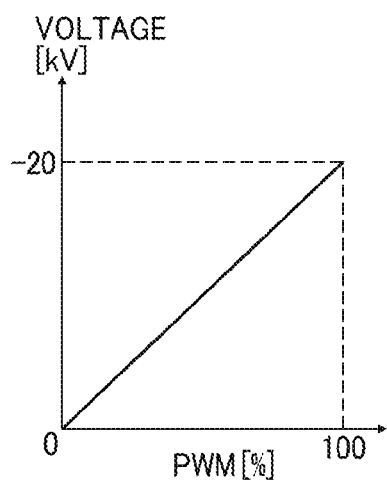
FIG. 6 is a graph illustrating a direct-current (DC) output value signal from the power supply controller illustrated in FIG. 3.

In the present embodiment, as described above, since the DC power supply 110 performs constant-voltage control, the second DC output value represents a DC voltage value. As illustrated in FIG. 6, the DC voltage value, which is the second DC output value, is indicated by the duty cycle of the DC output value signal SDV. Although the duty cycle of the DC output value signal SDV is 50% and the second DC output value is −10 kV in the present embodiment, those values are not limited thereto.

Note that, when the DC power supply 110 performs constant-current control, the second DC output value represents the value of DC current output from the DC power supply 110 inherent to output of DC voltage. In this case, the DC power supply 110 controls the value of DC voltage such that the value of DC current becomes the second DC output value.

The DC driver 111 causes the DC transformer 112 to output (to generate) a DC voltage based on the DC output value in accordance with the control signal received from the AC power supply 140. Specifically, in response to the first control signal SC1 received from the AC power supply 140, based on a first DC output value, the DC driver 111 causes the DC transformer 112 to output (to generate) the DC voltage. In response to the second control signal SC2 received from the AC power supply 140, based on the second DC output value, the DC driver 111 causes the DC transformer 112 to output (to generate) the DC voltage.

The first DC output value is for restricting the DC voltage value output from the DC power supply 110. Since the DC power supply 110 performs constant-voltage control as described above, similarly, the first DC output value indicates a DC voltage value. The first DC output value is smaller in absolute value than the second DC output value. In the present embodiment, the first DC output value is, for example, −5 kV, but not limited thereto.

Specifically, in a case where the second control signal SC2 from the AC power supply 140 is received, in response to the DC output value signal SDV received from the power supply controller 300, the DC driver 111 causes the DC transformer 112 to output DC voltage based on the second DC output value indicated by the DC output value signal SDV.

Figure 7:
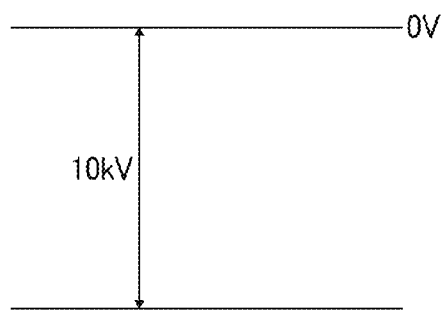
FIG. 7 is a graph illustrating a DC voltage generated by a secondary-transfer power supply illustrated in FIG. 3.

In the present embodiment, in a state in which the second control signal SC2 from the AC power supply 140 has been received, in response to the DC output value signal SDV from the power supply controller 300, the DC driver 111 drives the DC transformer 112 to output DC voltage at the second DC output value (e.g., −10 kV). Then, the DC transformer 112 outputs a negative DC high voltage of −10 kV as illustrated in FIG. 7 (DC bias output).

By contrast, in a case where the first control signal SC1 from the AC power supply 140 is received, in response to the DC output value signal SDV received from the power supply controller 300, the DC driver 111 restricts the value of DC voltage, from the second DC output value indicated by the DC output value signal SDV to the first DC output value, and causes the DC transformer 112 to output the restricted DC voltage.

In a state in which the second control signal SC1 from the AC power supply 140 has been received, in response to the DC output value signal SDV from the power supply controller 300, the DC driver 111 drives the DC transformer 112 to output DC voltage at the first DC output value (e.g., −5 kV), not the second DC output value (e.g., −10 kV). Then, the DC transformer 112 outputs a negative DC high voltage of −5 kV, which is restricted from −10 kV (DC bias output).

Further, the power supply controller 300 outputs an AC output value signal SAV to the AC power supply 140. The AC output value signal SAV indicates an AC output value to control the value of AC voltage output from the AC power supply 140. In the present embodiment, a pulse-width modulation (PWM) signal is used, but not limited thereto.

Figure 8:
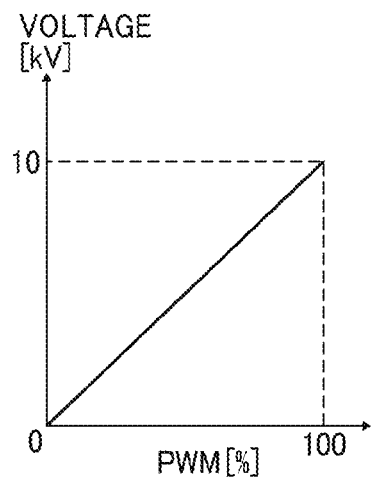
FIG. 8 is a graph illustrating an example of an AC output value signal from the power supply controller illustrated in FIG. 3.

In the present embodiment, as described above, since the AC power supply 140 performs constant-voltage control, the AC output value represents a potential difference between peaks (maximum voltage value and minimum voltage value) of AC voltage. As illustrated in FIG. 8, the potential difference, which is the AC output value, is indicated by the duty cycle of the AC output value signal SAV. Although the duty cycle of the AC output value signal SAV is 100% and the AC output value is 10 kV in the present embodiment, those values are not limited thereto.

Note that, when the AC power supply 140 performs constant-current control, the AC output value represents the value of AC current output from the AC power supply 140 inherent to output of AC voltage. In this case, the AC power supply 140 controls the value of AC voltage to adjust the value of AC current output to the AC output value.

Receiving the AC output value signal SAV in addition to the AC output reference signal SAR, the AC driver 141 causes the AC transformer 142 to generate an AC voltage based on the AC output reference signal SAR and the AC output value indicated by the AC output value signal SAV. The AC driver 141 causes the AC transformer 142 to output the superimposed voltage in which the generated AC voltage is superimposed with the DC voltage output from the DC power supply 110.

Figure 9:
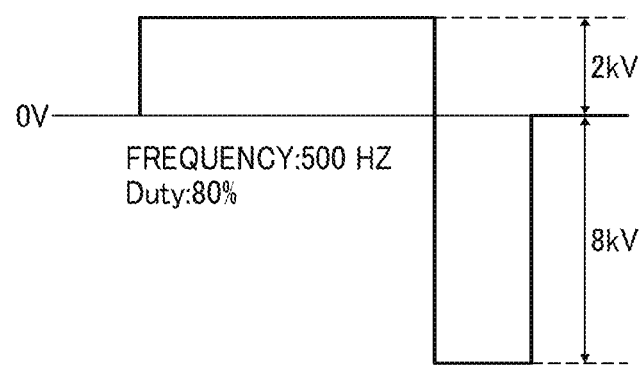
FIG. 9 is a graph illustrating an AC voltage generated by the secondary-transfer power supply illustrated in FIG. 3.

For example, it is assumed that the AC output reference signal SAR has a cycle T of 2.0 milliseconds and a pulse width t of 1.6 milliseconds to set the duty cycle at 80%, and the AC output value signal SAV has a duty cycle of 100% and an AC output value of 10 kV. In this case, based on the AC output reference signal SAR and the AC output value indicated by the AC output value signal SAV, the AC driver 141 drives the AC transformer 142 such that the value of AC voltage generated by the AC transformer 142 exhibits the waveform illustrated in FIG. 9. Then, the AC transformer 142 generates an AC voltage having an output waveform illustrated in FIG. 9.

Note that, since the duty cycle of the AC output reference signal SAR is 80% in this case, the AC power supply 140 outputs the first control signal SC1 to the DC power supply 110, and the value of DC voltage output from the DC power supply 110 is −5 kV, as described above.

Figure 10:
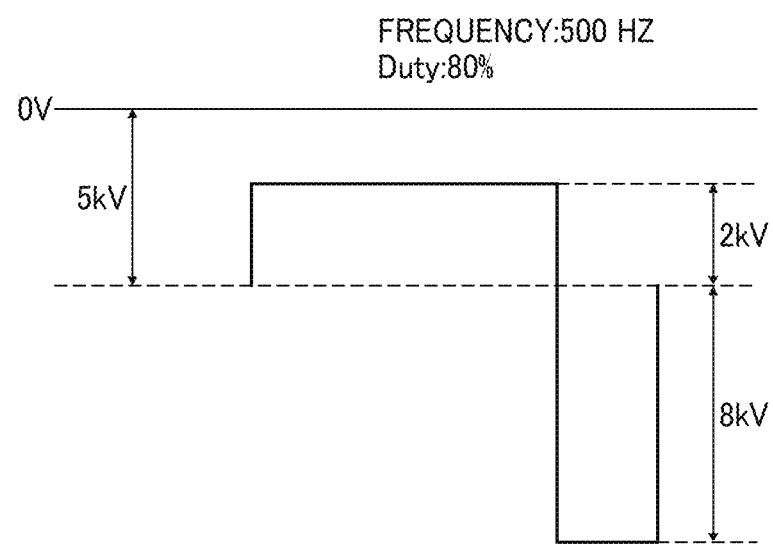
FIG. 10 is a graph illustrating a superimposed voltage generated by the secondary-transfer power supply illustrated in FIG. 3.

Accordingly, the superimposed voltage, in which the AC voltage generated by the AC transformer 142 is superimposed with the DC voltage output from the DC power supply 110, has the output waveform illustrated in FIG. 10.

In the case of the superimposed voltage illustrated in FIG. 10, the maximum negative voltage is −13 kV (the sum of −5 kV and −8 kV), and the maximum voltage applied to the output side (the output terminal) of the AC transformer 142 is −13 kV. The maximum value is smaller in absolute value than the withstand voltage (e.g., 15 kV) on the output side of the AC transformer 142. Accordingly, a voltage exceeding the withstand voltage is not applied to the AC transformer 142, and inconveniences such as damage to the AC transformer 142 can be prevented. In the superimposed voltage illustrated in FIG. 10, since the voltage ranging from −3 kV to −13 kV is applied to the secondary-transfer backup roller 63, desirable transfer performance can be attained.

Figure 11:
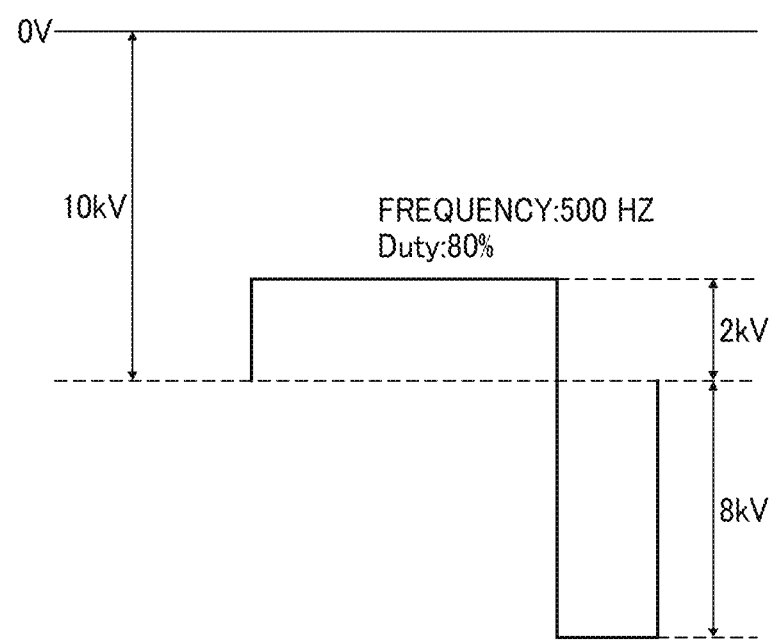
FIG. 11 is a graph illustrating a superimposed voltage according to a comparative example.

Note that, in a comparative example in which the AC power supply 140 does not output the first control signal SC1 to the DC power supply 110 and the value of DC voltage output from the DC power supply 110 is not restricted to −5 kV from −10 kV, the value of superimposed voltage, in which the AC voltage generated by the AC transformer 142 is superimposed with the DC voltage output from the DC power supply 110, has the output waveform illustrated in FIG. 11.

In the case of the superimposed voltage illustrated in FIG. 11, the maximum negative voltage is −18 kV (the sum of −10 kV and −8 kV). Accordingly, the maximum voltage applied to the output side (the output terminal) of the AC transformer 142 is −18 kV, which is greater in absolute value than the withstand voltage (e.g., 15 kV) on the output side of the AC transformer 142. Accordingly, a voltage exceeding the withstand voltage is applied to the AC transformer 142, and inconveniences such as damage to the AC transformer 142 may be caused thereby.

Additionally, it is assumed that the AC output reference signal SAR has a cycle T of 2.0 milliseconds and a pulse width t of 0.4 milliseconds to set the duty cycle at 20%, and the AC output value signal SAV has a duty cycle of 100% and an AC output value of 10 kV. Note that, since the duty cycle of the AC output reference signal SAR is 20% in this case, the AC power supply 140 outputs the second control signal SC2 to the DC power supply 110, and the value of DC voltage output from the DC power supply 110 is −10 kV, as described above.

Figure 12:
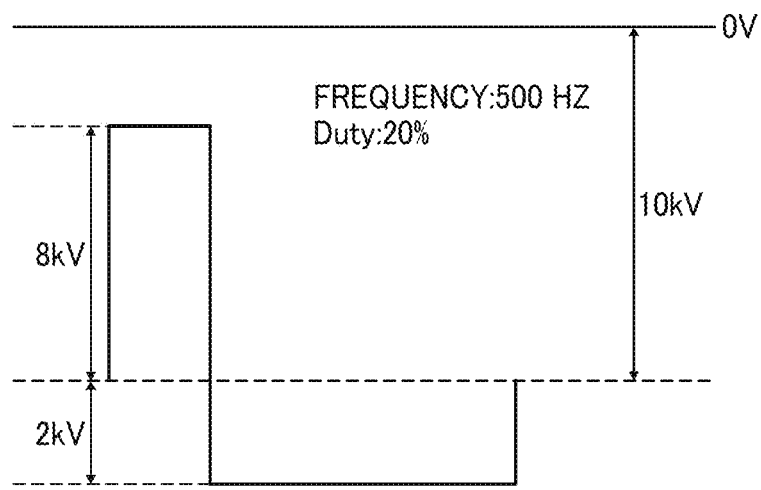
FIG. 12 is a graph illustrating another superimposed voltage generated by the secondary-transfer power supply illustrated in FIG. 3.

Accordingly, the superimposed voltage, in which the AC voltage generated by the AC transformer 142 is superimposed with the DC voltage output from the DC power supply 110, has the output waveform illustrated in FIG. 12.

In the case of the superimposed voltage illustrated in FIG. 12, the maximum negative voltage is −12 kV (the sum of −10 kV and −2 kV). Accordingly, although a voltage of −12 kV, at the maximum in absolute value, is applied to the output side (the output terminal) of the AC transformer 142, this voltage value is smaller in absolute value than the withstand voltage (i.e., 15 kV) on the output side of the AC transformer 142. Accordingly, application of voltage exceeding the withstand voltage to the AC transformer 142 can be prevented, and inconveniences such as damage to the AC transformer 142, caused thereby, can be prevented. In the superimposed voltage illustrated in FIG. 12, since the voltage ranging from −2 kV to −12 kV is applied to the secondary-transfer backup roller 63, desirable transfer performance can be attained.

Figure 13:
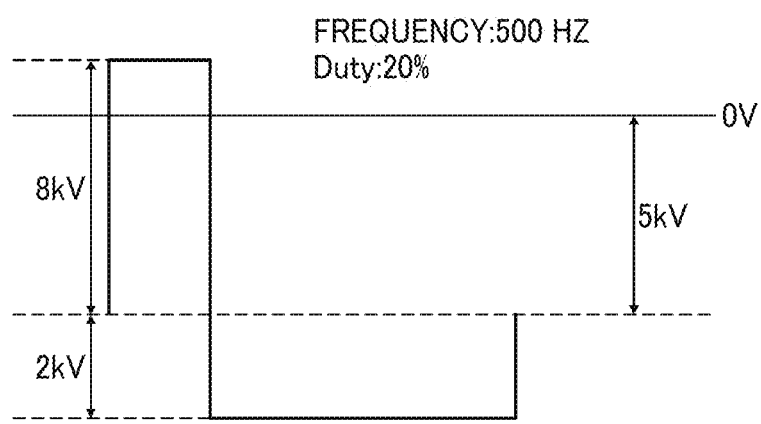
FIG. 13 is a graph illustrating a superimposed voltage according to a comparative example.

Note that, in a comparative example in which the AC power supply 140 outputs the first control signal SC1 to the DC power supply 110 and the value of DC voltage output from the DC power supply 110 is restricted to −5 kV from −10 kV, the superimposed voltage, in which the AC voltage generated by the AC transformer 142 is superimposed with the DC voltage output from the DC power supply 110, has the output waveform illustrated in FIG. 13.

In the case of the superimposed voltage illustrated in FIG. 13, the maximum negative voltage is −7 kV (the sum of −5 kV and −2 kV). Accordingly, although a maximum voltage of −7 kV is applied to the output side (the output terminal) of the AC transformer 142, this maximum voltage is smaller in absolute value than the withstand voltage (i.e., 15 kV) on the output side of the AC transformer 142. However, in the case of the superimposed voltage illustrated in FIG. 13, the voltage applied to the secondary-transfer backup roller 63 ranges from +3 kV to −7 kV, and the transfer bias is insufficient. Accordingly, desirable transfer performance is not attained.

According to the present embodiment described above, in the case where the superimposed bias, in which AC voltage having a high duty cycle (in percent) is superimposed with DC voltage, is used to transfer an image onto a recording medium having a smooth surface, the value of the DC voltage is restricted. Accordingly, the output superimposed bias can be suitable for image transfer while conforming to the withstand voltage of the AC power supply. Thus, defective transfer can be suppressed.

Additionally, according to the present embodiment, in the case where the superimposed bias, in which AC voltage having a low duty cycle (in percent) is superimposed with DC voltage, is used to transfer an image onto a recording medium having a coarse surface, the value of the DC voltage is not restricted. Accordingly, the output superimposed bias can be suitable for image transfer while conforming to the withstand voltage of the AC power supply. Thus, desirable performance of image transfer onto a recessed portion of the recording medium can be attained.

Thus, according to the embodiment described above, switching between restricting or not restricting the value of DC voltage is made according to the duty cycle of the output waveform of the AC voltage. Accordingly, regardless of sheet type (surface unevenness in particular), a superimposed bias suitable for image transfer can be output while conforming to the withstand voltage of the AC power supply.

Note that, although the AC power supply 140 outputs the first control signal SC1 to the DC power supply 110 to restrict the DC voltage output from the DC power supply 110 in the above-described embodiment, the DC voltage is restricted prior to superimposition of DC voltage with AC voltage. If the DC voltage is not restricted before the superimposition, the superimposed voltage temporality has the waveform illustrated in FIG. 11 and may damage the AC transformer 142.

In view of the foregoing, in the present embodiment, the power supply controller 300 is configured to output the signals to the secondary-transfer power supply 200 at the following timings, thereby restricting the DC voltage before the AC voltage is superimposed with the DC voltage.

Figure 14:
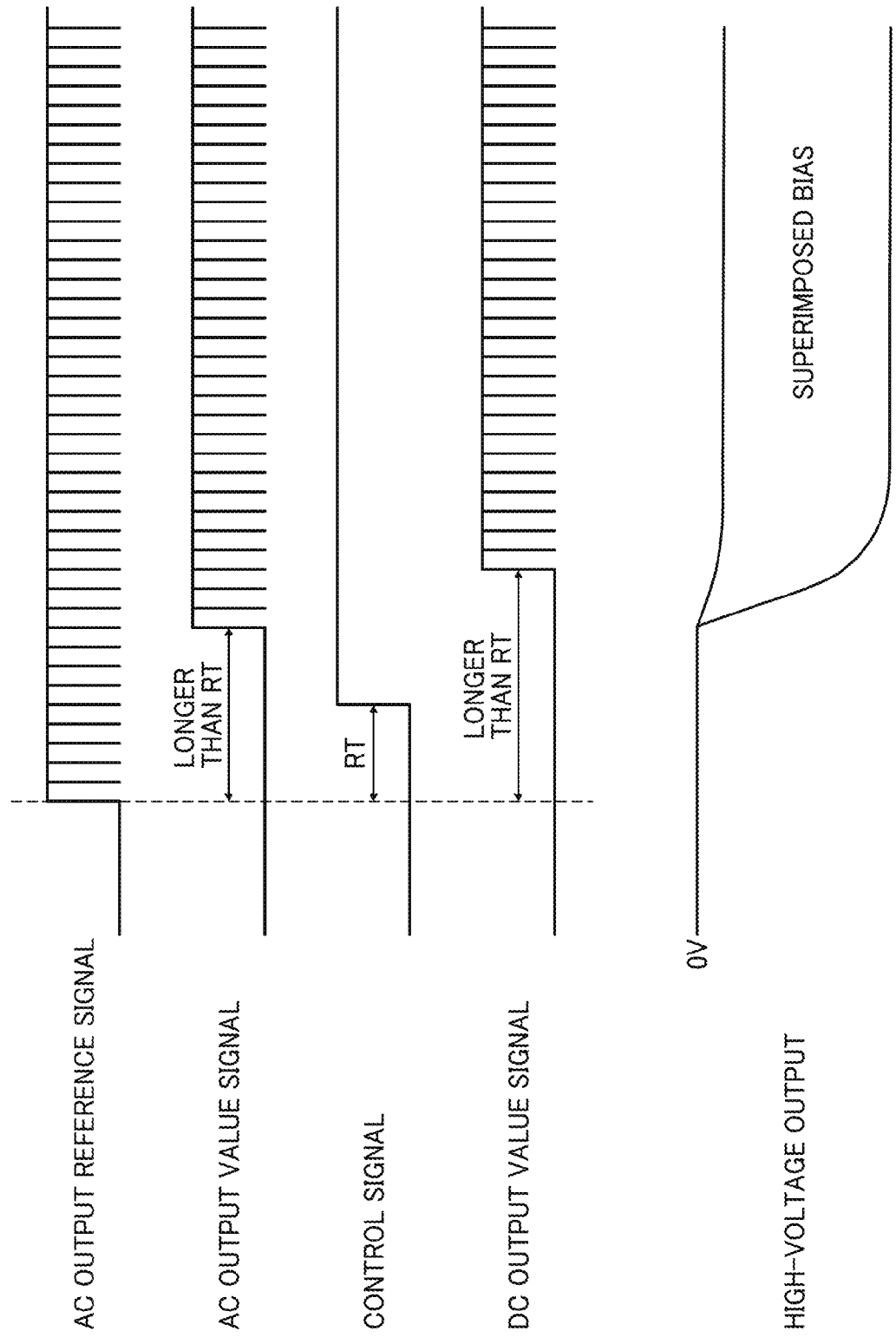
FIG. 14 is a timing chart of output of signals in controlling a superimposed bias output according to an embodiment.

FIG. 14 is a timing chart of output of signals in controlling the superimposed bias output according to the present embodiment.

In the configuration illustrated in FIG. 14, after a predetermined time RT has elapsed after the power supply controller 300 outputs the AC output reference signal SAR to the AC power supply 140, the power supply controller 300 outputs the DC output value signal SDV to the DC power supply 110. The predetermined time RT is a time period required for the AC power supply 140 to output the first control signal SC1 to the DC power supply 110. The predetermined time RT is stored in the ROM 330 serving as a memory, for example, by a manufacturer based on empirical data.

Specifically, the power supply controller 300 initially outputs the AC output reference signal SAR to the AC power supply 140. Note that the AC output reference signal SAR has a duty cycle not smaller than 50%.

Coinciding with the elapse of the predetermined time RT from when the power supply controller 300 outputs the AC output reference signal SAR to the AC power supply 140, the AC power supply 140 outputs the first control signal SC1 to the DC power supply 110.

The power supply controller 300 has a capability to measure time and measures the elapse of time after outputting the AC output reference signal SAR to the AC power supply 140. After the elapse of time equal to or longer than the predetermined time RT, the power supply controller 300 outputs the AC output value signal SAV to the AC power supply 140 and outputs the DC output value signal SDV to the DC power supply 110.

As a result, in response to the AC output reference signal SAR and the AC output value signal SAV, the AC power supply 140 outputs AC voltage (i.e., the AC bias) to the secondary-transfer backup roller 63. In response to the DC output value signal SDV, the DC power supply 110 outputs DC voltage to the AC power supply 140. The AC power supply 140 outputs the superimposed bias, in which the DC voltage is superimposed with the AC voltage, to the secondary-transfer backup roller 63.

Thus, in the configuration illustrated in FIG. 14, after the first control signal SC1 is input to the DC power supply 110, the DC output value signal SDV is input thereto. Accordingly, the DC voltage output from the DC power supply 110 is restricted from the start of output, and the DC voltage can be reliably restricted prior to the superimposition of DC voltage with AC voltage.

In the configuration illustrated in FIG. 14, although the power supply controller 300 outputs the DC output value signal SDV after outputting the AC output value signal SAV, the sequence of the AC output value signal SAV and the DC output value signal SDV is not limited as long as those signals are output after a period equal to or greater than the predetermined time RT has elapsed from when the AC output reference signal SAR is output to the AC power supply 140.

The configuration illustrated in FIG. 14 is described using an example in which the duty cycle of the AC output reference signal SAR is equal to or greater than 50% and the AC power supply 140 outputs the first control signal SC1 to the DC power supply 110. The sequence of signal output illustrated in FIG. 14 is also applied to the case where the duty cycle of the AC output reference signal SAR is smaller than 50% and the AC power supply 140 outputs the second control signal SC2 to the DC power supply 110.

(Variation 1)

Figure 15:
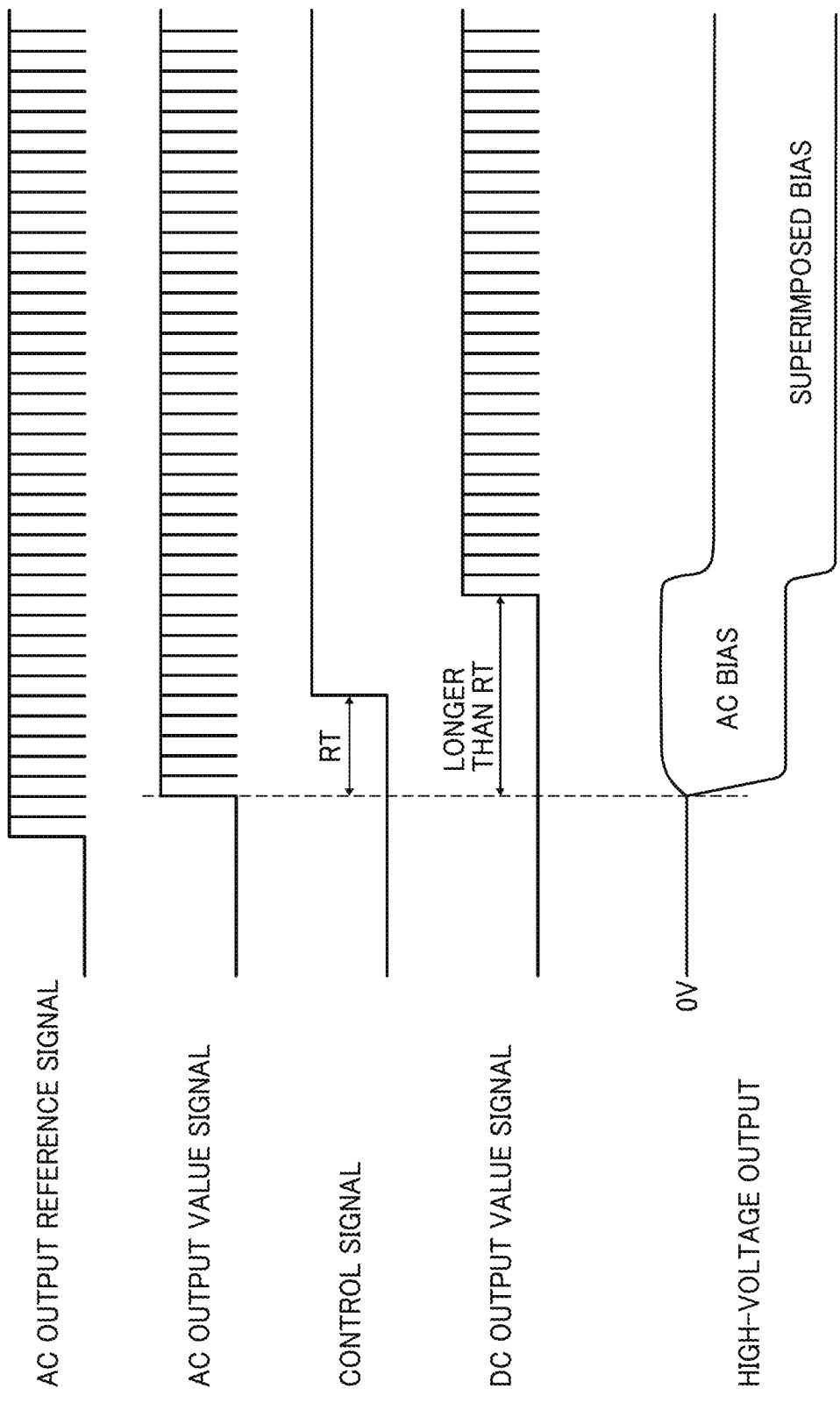
FIG. 15 is a timing chart of output of signals in controlling a superimposed bias output according to Variation 1.

In Variation 1, descriptions are given below of output timings of signals in controlling the output of superimposed bias, different from the output timings of the embodiment described above. FIG. 15 is a timing chart of output of signals in controlling the superimposed bias output according to Variation 1.

In the configuration illustrated in FIG. 15, in response to the AC output reference signal SAR and the AC output value signal SAV, the AC power supply 140 outputs the first control signal SC1 to the DC power supply 110 and generates an AC voltage based on the AC output reference signal SAR and the AC output value indicated by the AC output value signal SAV. After the elapse of the predetermined time RT starting after outputting the AC output reference signal SAR and the AC output value signal SAV to the AC power supply 140, the power supply controller 300 outputs the DC output value signal SDV to the DC power supply 110. The predetermined time RT is stored, for example, in the ROM 330, and represents a time period required for the AC power supply 140 to output the first control signal SC1 to the DC power supply 110.

Specifically, the power supply controller 300 outputs the AC output reference signal SAR to the AC power supply 140 and outputs the AC output value signal SAV to the AC power supply 140. Note that the AC output reference signal SAR has a duty cycle not smaller than 50% in the example illustrated in FIG. 15.

In response to the AC output reference signal SAR and the AC output value signal SAV, the AC power supply 140 outputs the first control signal SC1 to the DC power supply 110 after elapse of the predetermined time RT starting after the power supply controller 300 outputs the AC output reference signal SAR and the AC output value signal SAV to the AC power supply 140 (after the AC output reference signal SAR and the AC output value signal SAV are input to the AC power supply 140).

The power supply controller 300 measures the elapse of time after outputting the AC output reference signal SAR and the AC output value signal SAV to the AC power supply 140. After the elapse of time equal to or longer than the predetermined time RT, the power supply controller 300 outputs the DC output value signal SDV to the DC power supply 110.

As a result, in response to the AC output reference signal SAR and the AC output value signal SAV, the AC power supply 140 outputs AC voltage (i.e., the AC bias) to the secondary-transfer backup roller 63. In response to the DC output value signal SDV, the DC power supply 110 outputs DC voltage to the AC power supply 140, and the AC power supply 140 outputs the superimposed bias, in which the DC voltage is superimposed with the AC voltage, to the secondary-transfer backup roller 63.

Thus, also in the configuration illustrated in FIG. 15, after the first control signal SC1 is input to the DC power supply 110, the DC output value signal SDV is input thereto. Accordingly, the DC voltage output from the DC power supply 110 is restricted from the start of output, and the DC voltage can be reliably restricted prior to the superimposition of DC voltage with AC voltage.

Note that, in the configuration illustrated in FIG. 15, the power supply controller 300 outputs the AC output value signal SAV after outputting the AC output reference signal SAR. However, the sequence of the AC output reference signal SAR and the AC output value signal SAV is not limited as long as i) the AC power supply 140 outputs the first control signal SC1 to the DC power supply 110 after the elapse of the predetermined time RT after input of both of the AC output reference signal SAR and the AC output value signal SAV, and ii) the power supply controller 300 measures the elapse of the predetermined time RT after outputting the AC output reference signal SAR and the AC output value signal SAV to the AC power supply 140, are satisfied.

The configuration illustrated in FIG. 15 is described using an example in which the duty cycle of the AC output reference signal SAR is equal to or greater than 50% and the AC power supply 140 outputs the first control signal SC1 to the DC power supply 110. The sequence of signal output illustrated in FIG. 14 is also applied to the case where the duty cycle of the AC output reference signal SAR is smaller than 50% and the AC power supply 140 outputs the second control signal SC2 to the DC power supply 110.

(Variation 2)

Figure 16:
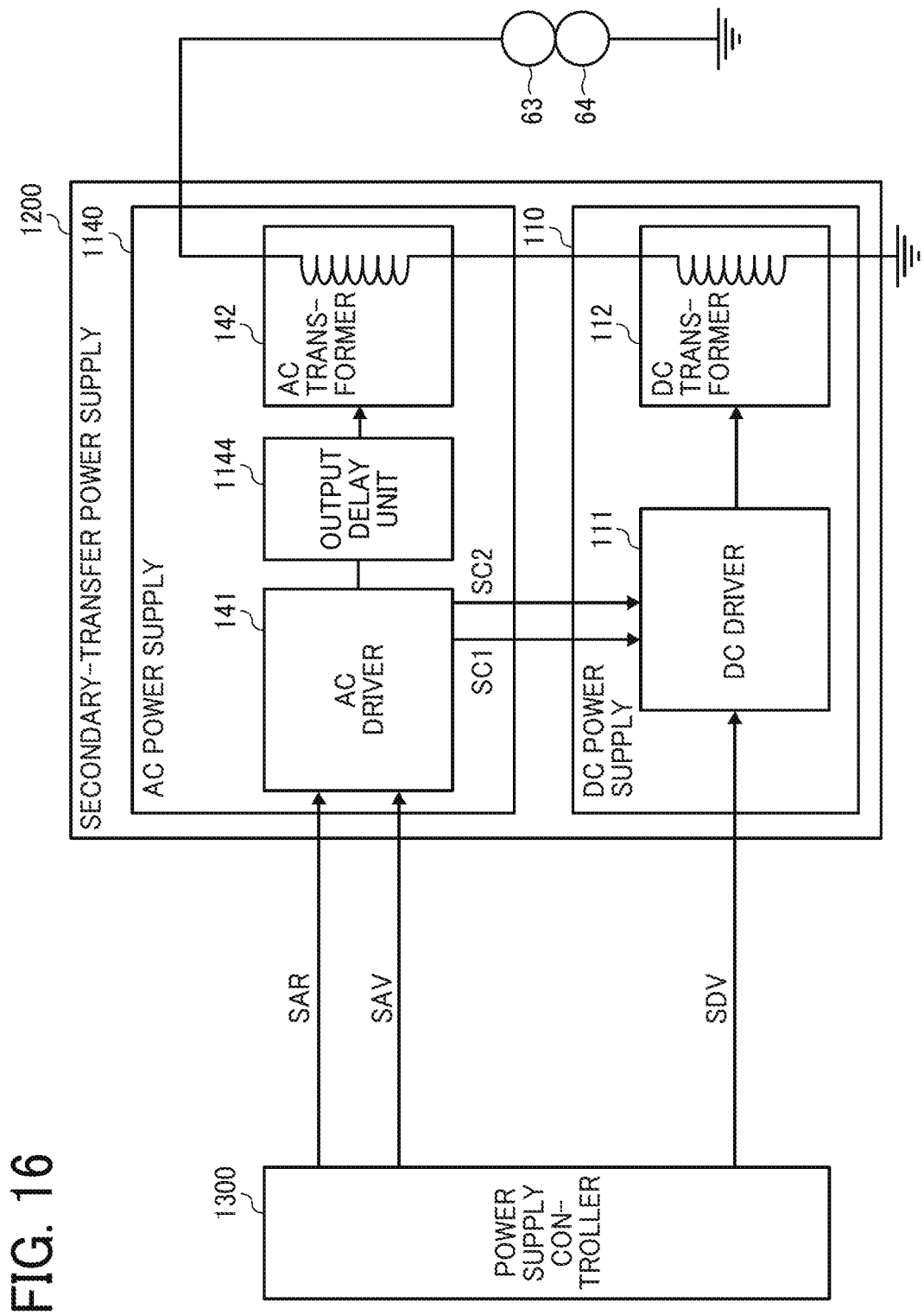
FIG. 16 is a block diagram of a power supply controller and a secondary-transfer power supply according to Variation 2.
Figure 17:
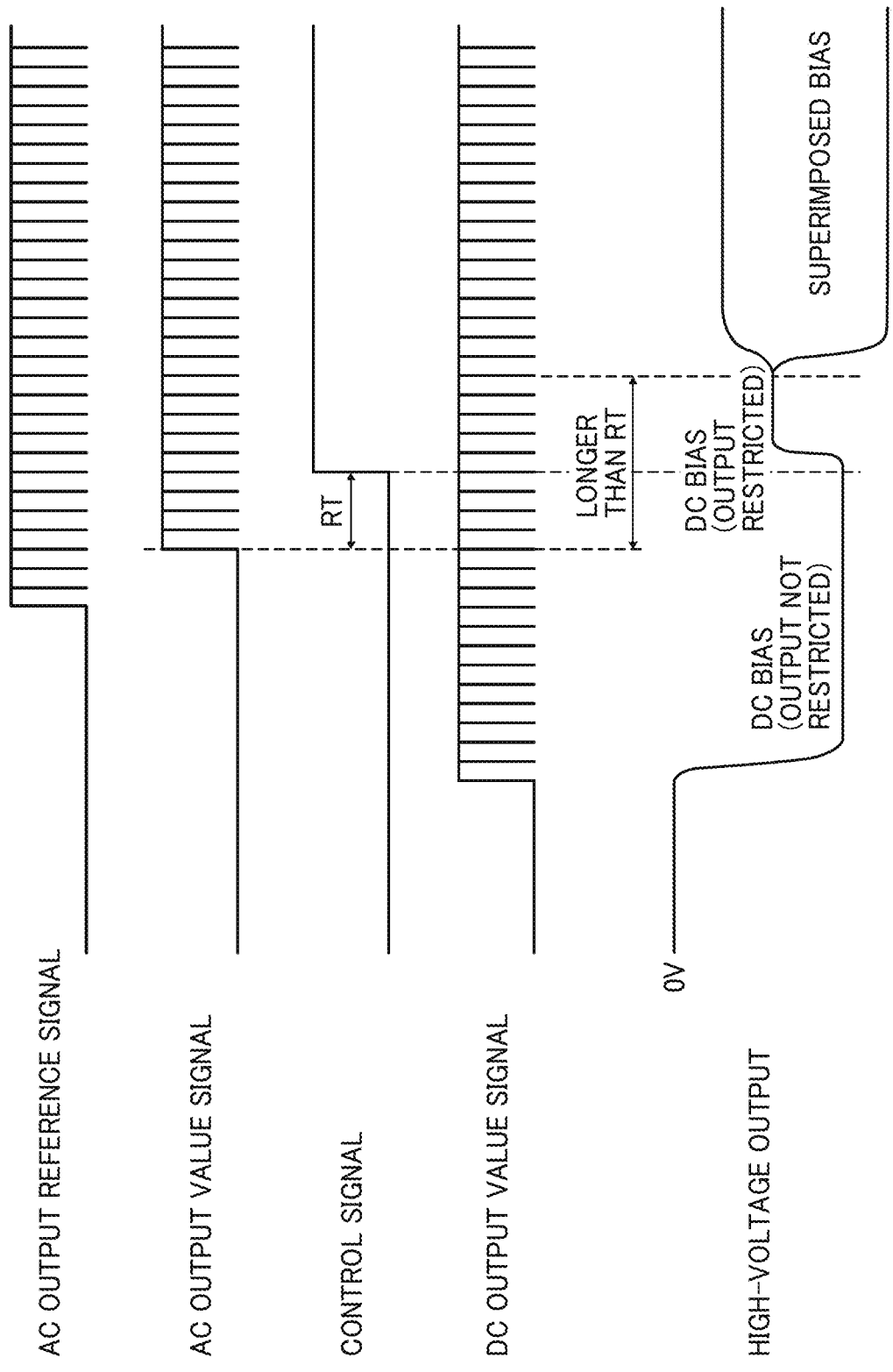
FIG. 17 is a timing chart of output of signals in controlling a superimposed bias output according to Variation 2.

In Variation 2, descriptions are given below of output timings of signals in controlling the output of superimposed bias, different from the output timings of the above-described embodiment and those of Variation 1. FIG. 16 is a block diagram illustrating an example of a power supply controller 1300 and a secondary-transfer power supply 1200 according to Variation 2. FIG. 17 is a timing chart of output of signals in controlling the superimposed bias output according to Variation 2.

As illustrated in FIG. 16, an AC power supply 1140 of the secondary-transfer power supply 1200 includes an output delay unit 1144, which is different from the above-described embodiment and those of Variation 1.

The output delay unit 1144, for example, a delay circuit including a capacitor, is disposed between the AC driver 141 and the AC transformer 142. The AC driver 141 outputs a drive signal to drive the AC transformer 142, and the output delay unit 1144 is configured to delay input of the drive signal to the AC transformer 142.

In the configuration illustrated in FIG. 17, output of at least one of the AC output reference signal SAR and the AC output value signal SAV, both of which are output from the power supply controller 1300 to the AC power supply 1140, is made after the power supply controller 1300 outputs the DC output value signal SDV to the DC power supply 110.

In response to the AC output reference signal SAR and the AC output value signal SAV, the AC power supply 1140 outputs the first control signal SC1 to the DC power supply 110.

Specifically, the power supply controller 1300 outputs the DC output value signal SDV to the DC power supply 110.

Subsequently, the power supply controller 1300 outputs the AC output reference signal SAR and the AC output value signal SAV to the AC power supply 1140. Note that the AC output reference signal SAR has a duty cycle not smaller than 50%.

In response to the AC output reference signal SAR and the AC output value signal SAV, the AC power supply 1140 outputs the first control signal SC1 to the DC power supply 110 after the elapse of the predetermined time RT starting after the power supply controller 1300 outputs the AC output reference signal SAR and the AC output value signal SAV to the AC power supply 1140 (after the AC output reference signal SAR and the AC output value signal SAV are input to the AC power supply 1140).

As a result, in response to the DC output value signal SDV, the DC power supply 110 outputs a DC voltage to the AC power supply 1140. In response to the first control signal SC1, the DC power supply 110 restricts the DC voltage being output (from −10 kV to −5 kV) and outputs the restricted DC voltage to the AC power supply 1140. Further, in the AC power supply 1140, in response to the AC output reference signal SAR and the AC output value signal SAV, the AC transformer 142 generates an AC voltage after the delay time by the output delay unit 1144. The delay time starts at or after the input of the AC output reference signal SAR and the AC output value signal SAV. Then, the AC power supply 1140 outputs the superimposed bias, in which the AC voltage is superimposed with the DC voltage, to the secondary-transfer backup roller 63.

In Variation 2, the delay time caused by the output delay unit 1144 is equal to or greater than the predetermined time RT. Thus, even in the case where the DC power supply 110 outputs the DC voltage without restricting the output value, the AC power supply 1140 generates the AC voltage after the DC voltage output from the DC power supply 110 is restricted. Accordingly, the DC voltage is reliably restricted prior to the superimposition of DC voltage with AC voltage.

Note that, in the configuration illustrated in FIG. 17, the power supply controller 300 outputs the AC output value signal SAV after outputting the AC output reference signal SAR. However, the sequence of the AC output reference signal SAR and the AC output value signal SAV is not limited as long as the AC power supply 1140 outputs the first control signal SC1 to the DC power supply 110 after the elapse of the predetermined time RT after input of both of the AC output reference signal SAR and the AC output value signal SAV.

The configuration illustrated in FIG. 17 is described using an example in which the duty cycle of the AC output reference signal SAR is equal to or greater than 50% and the AC power supply 1140 outputs the first control signal SC1 to the DC power supply 110. The sequence of signal output illustrated in FIG. 17 is also applied to the case where the duty cycle of the AC output reference signal SAR is smaller than 50% and the AC power supply 1140 outputs the second control signal SC2 to the DC power supply 110.

(Variation 3)

Figure 18:
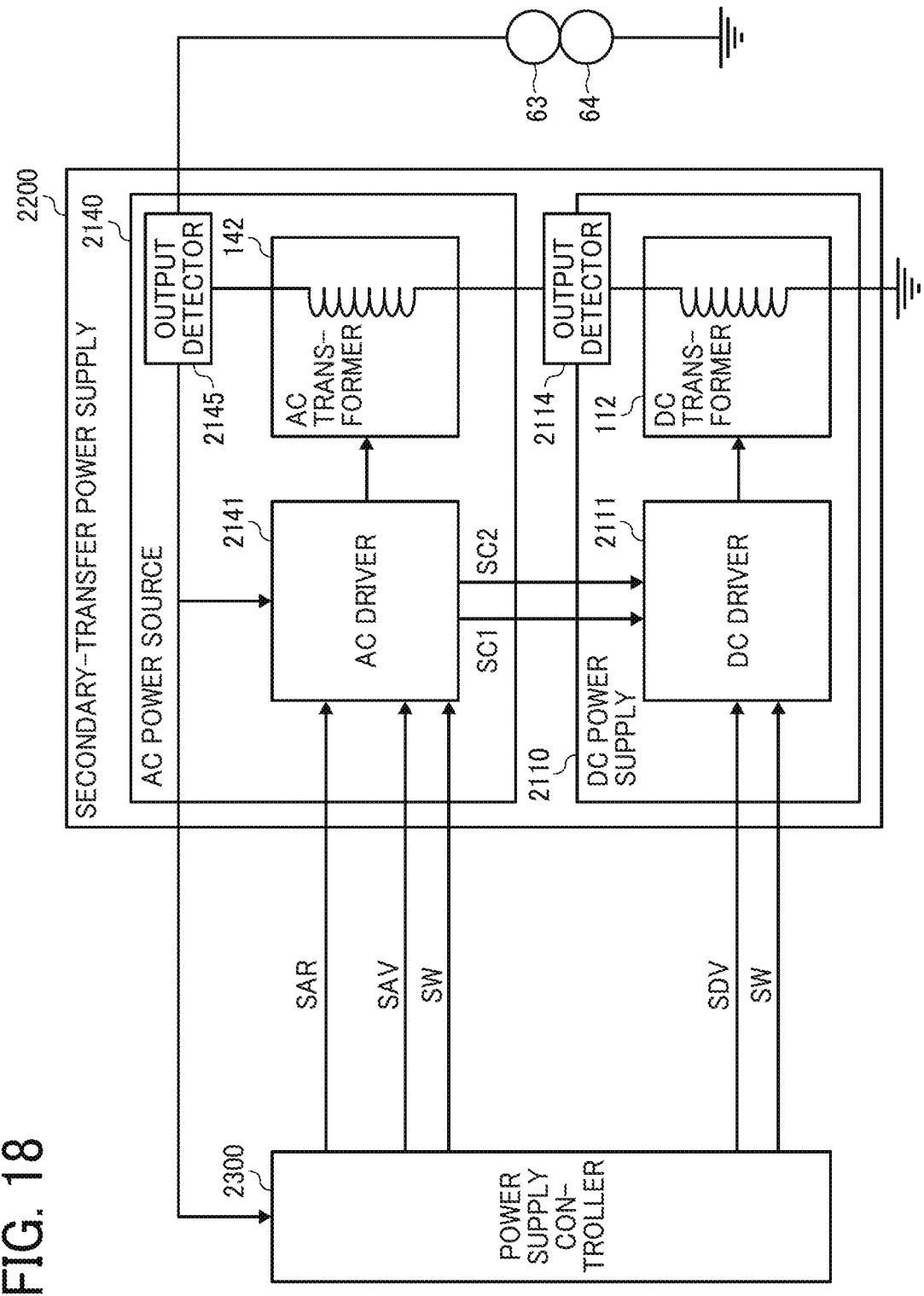
FIG. 18 is a block diagram of a power supply controller and a secondary-transfer power supply according to Variation 3.

In Variation 3, a feedback control is performed to output the superimposed voltage. FIG. 18 is a block diagram illustrating an example of a power supply controller 2300 and a secondary-transfer power supply 2200 according to Variation 3.

As illustrated in FIG. 18, in the secondary-transfer power supply 2200, an AC power supply 2140 includes an AC driver 2141 and an output detector 2145, which are differences from the above-described embodiment and Variations 1 and 2, and a DC power supply 2110 includes a DC driver 2111 and an output detector 2114, which are differences from the above-described embodiment and Variations 1 and 2.

The output detector 2145 is configured to detect the AC voltage output from the AC transformer 142 and outputs the detected AC voltage to the AC driver 2141. For example, the output detector 2145 is a detection circuit capable of detecting the value of voltage. Based on the voltage value detected by the output detector 2145, the AC output reference signal SAR, and the AC output value indicated by the AC output value signal SAV, the AC driver 2141 causes the AC transformer 142 to generate an AC voltage according to the AC output reference signal SAR and the AC output value signal SAV.

The output detector 2114 is configured to detect the DC voltage output from the DC transformer 112 and outputs the detected DC voltage to the DC driver 2111. For example, the output detector 2114 is a detection circuit that detects the value of voltage. Based on the voltage value detected by the output detector 2114, one of the first control signal SC1 and the second control signal SC2, and the second DC output value indicated by the DC output value signal SDV, the DC driver 2111 causes the DC transformer 112 to generate a DC voltage according to either the first DC output value or the second DC output value.

Note that, in Variation 3, the power supply controller 2300 outputs, to the DC power supply 2110, a switching signal SW for switching between constant voltage and constant current, and thus the DC power supply 2110 switches the control type between constant-voltage control and constant-current control. Similarly, the power supply controller 2300 outputs, to the AC power supply 2140, the switching signal SW for switching between constant voltage and constant current, and thus the AC power supply 2140 switches the control type between constant-voltage control and constant-current control.

In the case of constant-current control, the output detector 2145 detects the AC current output from the AC transformer 142 and outputs the detected AC current to the power supply controller 2300. For example, the output detector 2145 is a detection circuit that detects the value of electrical current. The power supply controller 2300 then adjusts the AC output value indicated by the AC output value signal SAV based on the value of current detected by the output detector 2145 and outputs the AC output reference signal SAR and the AC output value signal SAV to the AC power supply 2140.

In the case of constant-current control, the output detector 2114 detects the DC current output from the DC transformer 112 and outputs the detected DC current to the power supply controller 2300. For example, the output detector 2114 is a detection circuit capable of detecting the value of electrical current. The power supply controller 2300 then adjusts the second DC output value indicated by the DC output value signal SDV based on the value of current detected by the output detector 2114 and outputs the DC output value signal SDV to the DC power supply 2110.

(Variation 4)

In the above-described embodiment and Variations 1 to 3, the AC power supply outputs either the first control signal SC1 or the second control signal SC2 to the DC power supply depending on the duty cycle of the output waveform of the AC voltage. Alternatively, in Variation 4, the power supply controller outputs either the first control signal SC1 or the second control signal SC2 to the DC power supply depending on the duty cycle of the output waveform of the AC voltage.

(Variation 5)

In the above-described embodiment and Variations 1 to 4, the DC voltage is restricted to prevent the superimposed voltage from exceeding the withstand voltage of the AC power supply. Alternatively, in Variation 5, the DC voltage is restricted to prevent the superimposed voltage from leaking from the AC power supply.

(Variation 6)

In the above-described embodiment and Variations 1 to 5, the AC power supply identifies the output waveform of the AC voltage with one of two output waveforms (high duty-cycle waveform or low duty-cycle waveform). Alternatively, in Variation 6, the AC power supply identifies the output waveform of the AC voltage with one of three or more waveforms.

(Variation 7)

In the above-described embodiment and Variations 1 to 6, at least two of the power supply controller, the DC power supply, and the AC power supply can be implemented by an identical control board.

(Variation 8)

In the above-described embodiment, the secondary-transfer power supply 200 is coupled to the secondary-transfer backup roller 63 to apply the transfer bias to the secondary-transfer backup roller 63. Alternatively, the secondary-transfer power supply 200 can be coupled to the secondary transfer roller 64 to apply the transfer bias thereto. In this case, a toner image can be reliably transferred onto a recording medium. Yet alternatively, one end of the secondary-transfer power supply 200 can be coupled to the secondary-transfer backup roller 63, and the other end of the secondary-transfer power supply 200 can be coupled to the secondary transfer roller 64. In this case, a toner image can be reliably transferred onto a recording medium.

Each of the functions of the above-described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A power supply device, comprising:
a DC power supply circuit to output a DC voltage; and
an AC power supply circuit to output a superimposed voltage in which the DC voltage is superimposed with an AC voltage, wherein the superimposed voltage is output to transfer a toner image onto a sheet, the superimposed voltage alternates between a first peak voltage and a second peak voltage, an absolute value of the first peak voltage being greater than an absolute value of the second peak voltage, and an output value of DC voltage is restricted when a duty cycle is equal to or greater than a threshold, the duty cycle being represented as (t/T)×100, where T represents a cycle of the AC voltage, and t represents a pulse width of the second peak voltage.

2. The power supply device according to claim 1, further comprising:

a power supply control circuit to output an AC output reference signal for determining an output waveform of the AC voltage, wherein the AC power supply circuit is to output one of a plurality of control signals to the DC power supply circuit in accordance with the duty cycle of the output waveform of the AC voltage, and wherein the DC power supply circuit is to output the DC voltage according to a DC output value corresponding to the one of the plurality of control signals.

3. The power supply device according to claim 2, wherein the plurality of control signals includes a first control signal and a second control signal, wherein the AC power supply circuit is to:

output, as the one of the plurality of control signals, the first control signal to the DC power supply circuit when the duty cycle is greater than the threshold; and output, as the one of the plurality of control signals, the second control signal to the DC power supply circuit when the duty cycle is smaller than the threshold, and wherein the DC power supply circuit is to:

output the DC voltage according to a first DC output value in response to the first control signal; and output the DC voltage according to a second DC output value in response to the second control signal, the second DC output value different from the first DC output value.

4. The power supply device according to claim 3, wherein the DC voltage is a negative voltage, wherein each of the first DC output value and the second DC output value is a negative value, wherein an absolute value of the first DC output value is smaller than an absolute value of the second DC output value, wherein the first control signal indicates restricting the DC voltage, wherein the second control signal indicates not restricting the DC voltage, wherein the power supply control circuit is to output, to the DC power supply circuit, a DC output value signal indicating the second DC output value, and wherein the DC power supply circuit is to:

output the DC voltage according to the first DC output value restricted from the second DC output value, in response to the DC output value signal from the power supply control circuit and the first control signal from the AC power supply circuit; and output the DC voltage according to the second DC output value, in response to the second control signal output from the AC power supply circuit.

5. The power supply device according to claim 4, further comprising:

a memory to store data used by the power supply control circuit, wherein the power supply control circuit is to output the DC output value signal to the DC power supply circuit after elapse of a predetermined time stored in the memory, the predetermined time required for the AC power supply circuit to output the first control signal to the DC power supply circuit, the predetermined time starting after the power supply control circuit outputs the AC output reference signal to the AC power supply circuit.

6. The power supply device according to claim 4, further comprising:

a memory to store data used by the power supply control circuit, wherein the power supply control circuit is to output, to the AC power supply circuit, an AC output value signal indicating an AC output value, wherein, in response to a combination of the AC output reference signal and the AC output value signal, the AC power supply circuit is to output the first control signal to the DC power supply circuit and generate the AC voltage according to the AC output reference signal and the AC output value indicated by the AC output value signal, and wherein the power supply control circuit is to output the DC output value signal to the DC power supply circuit, after elapse of a predetermined time stored in the memory, the predetermined time required for the AC power supply circuit to output the first control signal to the DC power supply circuit, the predetermined time starting after the power supply control circuit outputs the AC output reference signal and the AC output value signal to the AC power supply circuit.

7. The power supply device according to claim 4, further comprising:

a memory to store data used by the power supply control circuit, wherein the AC power supply circuit includes:

an AC transformer circuit;

an AC driver circuit to output a drive signal to drive the AC transformer circuit; and a delay circuit connected between the AC transformer circuit and the AC driver circuit, the delay circuit to delay input of the drive signal to the AC transformer circuit, wherein the power supply control circuit is to output, to the AC power supply circuit, an AC output value signal indicating an AC output value, wherein output of at least one of the AC output reference signal and the AC output value signal is after output of the DC output value, and wherein, in response to the AC output reference signal and the AC output value signal, the AC power supply circuit is to:

output the first control signal to the DC power supply circuit; and generate the AC voltage according the AC output reference signal and the AC output value indicated by the AC output value signal, after elapse of a predetermined time stored in the memory, the predetermined time required for the DC power supply circuit to output the DC voltage according to the first DC output value, the predetermined time starting after output of the first control signal to the DC power supply circuit.

8. An image forming apparatus, comprising:
an image forming device to form an image;
a transfer device to transfer the image onto a recording medium; and
the power supply device according to claim 1, to supply the superimposed voltage to the transfer device.

9. The power supply device according to claim 1, wherein
the AC power supply circuit is configured to output a control signal based on the duty cycle of the AC voltage, and
the DC power supply circuit is configured to output the DC voltage according to at least the control signal.

10. The power supply device according to claim 9, wherein the DC power supply circuit is configured to restrict an output value of the DC voltage according to the control signal.

11. The power supply device according to claim 1, wherein the output value of DC voltage is not restricted when the duty cycle is less than the threshold.

12. An output control method, comprising:
generating an AC voltage;
determining a DC output value in accordance with the AC voltage;
outputting a DC voltage according to the DC output value; and
outputting a superimposed voltage in which the DC voltage is superimposed with the AC voltage, wherein
the superimposed voltage is output to transfer a toner image onto a sheet,
the superimposed voltage alternates between a first peak voltage and a second peak voltage, an absolute value of the first peak voltage being greater than an absolute value of the second peak voltage, and
an output value of DC voltage is restricted when a duty cycle is equal to or greater than a threshold, the duty cycle being represented as (t/T)×100, where T represents a cycle of the AC voltage, and t represents a pulse width of the second peak voltage.

13. The method according to claim 12, wherein
the generating the AC voltage outputs a control signal based on the duty cycle of the AC voltage, and
the determining the DC voltage determines the DC voltage according to at least the control signal.

14. The method according to claim 13, wherein the outputting the DC voltage restricts the output value of the DC voltage according to the control signal.

15. The method according to claim 12, wherein the output value of the DC voltage is not restricted when the duty cycle is less than the threshold.

16. A power supply device comprising:
means for outputting a DC voltage;
means for outputting a superimposed voltage in which the DC voltage is superimposed with an AC voltage; and
means for controlling the means for outputting the superimposed voltage and the means for outputting the DC voltage to output the DC voltage, wherein
the superimposed voltage is output to transfer a toner image onto a sheet,
the superimposed voltage alternates between a first peak voltage and a second peak voltage, an absolute value of the first peak voltage being greater than an absolute value of the second peak voltage, and
an output value of DC voltage is restricted when a duty cycle is equal to or greater than a threshold, the duty cycle being represented as (t/T)×100, where T represents a cycle of the AC voltage, and t represents a pulse width of the second peak voltage.

17. The power supply device according to claim 16, wherein
the means for outputting a superimposed voltage is configured to output a control signal based on the duty cycle of the AC voltage superimposed, and
the means for outputting the DC voltage is configured to output the DC voltage according to at least the control signal.

18. The power supply device according to claim 17, wherein the means for outputting a DC voltage is for restricting the output value of the DC voltage according to the control signal.

19. The power supply device according to claim 16, wherein the output value of the DC voltage is not restricted when the duty cycle is less than the threshold.

20. A power supply device, comprising:
a DC power supply circuit to output a DC voltage according to a DC output value;
an AC power supply circuit to output a superimposed voltage in which the DC voltage is superimposed with an AC voltage; and
a power supply control circuit to output an AC output reference signal to determine a waveform of the AC voltage,
wherein the superimposed voltage is output to transfer a toner image onto a sheet,
wherein the DC output value is restricted when a duty cycle is equal to or greater than a threshold, the duty cycle being represented as(t/T)×100, where T represents a cycle of the AC voltage of the AC output reference signal, and t represents a pulse width of the AC output reference signal, and
wherein the pulse width is a portion of one cycle of waveform, the pulse width being a time period during which a polarity of AC voltage is opposite a polarity of the DC voltage.

21. The power supply device according to claim 20, wherein the DC output value is not restricted when the duty cycle is less than the threshold.

* * * * *